United States Patent Office 3,235,544
Patented Feb. 15, 1966

3,235,544
DI(2-PROPYLENIMINOETHYL)SULFONE
Ray C. Christena, North Ogden, Utah, and Edward Broderick, Perkasie, Pa., assignors to Thiokol Chemical Corporation, Bristol, Pa., a corporation of Delaware
No Drawing. Filed Dec. 6, 1962, Ser. No. 243,211
1 Claim. (Cl. 260—239)

The present invention relates to a novel curing agent for carboxyl containing polymers. More particularly the present invention relates to di(2-propyleniminoethyl) sulfone.

An object of the present invention is to provide a novel curing agent for carboxyl containing polymers.

Another object of this invention is to provide a curing agent for carboxyl containing polymers which can be safely used in the fabrication of propellant matrices which contain ammonium perchlorate as an oxidizing agent.

Curable, liquid polymers are used in conjunction with various other materials, such as, curing agents, burning rate modifiers and oxidizers to form rocket propellant matrices. The liquid polymers are used, upon cure thereof, with suitable curing agents, to form solid fuel binders in which all the other ingredients of the proposed propellant composition are evenly distributed to insure uniform burning properties upon ignition of the propellant. Each of the components of the propellant formulation must be physically and chemically compatible with all the other components to enable the propellant composition to be safely formulated and used. Attempts to use di-(2-ethyleniminoethyl)sulfone as a curing agent for carboxyl containing polymers in propellant formulations calling for ammonium perchlorate as the desired oxidizing agent have been unsuccessful to date because when mixed together these materials will burst into flames quite readily.

It has now been unexpectedly found, according to the present invention, that ammonium perchlorate can be safely used as an oxidizing agent in propellant compositions made with a carboxyl containing polymer and a sulfone derived imine curing agent if di(2-propyleniminoethyl)sulfone, i.e.,

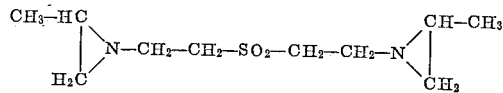

is used as the curing agent in such propellant compositions.

Di(2-propyleniminoethyl)sulfone is a water white to light amber colored liquid having a viscosity of about 70 centipoises at 25° C., a specific gravity of 1.0846 at 25° C., a refractive index of 1.4816 at 25° C., and a boiling point of 145–148° C./0.8 mm. The di(2-propyleniminoethyl) sulfone is formed by reacting divinyl sulfone with propylene imine on a 1:2 mol basis with an excess of the imine at about 15 to 25° C. To purify the resulting di(2-propyleniminoethyl)sulfone reaction product it is stripped of the unreacted, excess imine under vacuum. The reaction can be conducted batchwise or continuously. No solvent is needed.

The di(2-propyleniminoethyl)sulfone may be readily and safely used according to the present invention as a curing agent for carboxyl containing polymers such as polybutadiene/acrylic acid copolymers, polybutadiene/acrylic acid/acrylonitrile terpolymers, carboxyl terminated polybutadiene and carboxyl containing polyesters in propellant matrices in which ammonium perchlorate is used as an oxidizing agent.

The following example is merely illustrative of the present invention and is not intended as a limitation upon the scope thereof.

*Example*

142.5 grams (2.5 mols) of propylene imine were added with constant stirring over a 40 minute period at 15–20° C. to 118 grams (1 mol) of divinyl sulfone. The mixture was stirred at room temperature for an additional three hours. The excess propylene imine was stripped from the resulting di(2-propyleniminoethyl)sulfone reaction product overnight in a rotary vacuum drier. 236 grams of the di(2-propyleniminoethyl)sulfone were thus recovered. Di(2-propyleniminoethyl)sulfone has an aziridinal content of 0.86 equivalent of HCl/100 grams of sulfone.

A mixture of ammonium perchlorate and di(2-propyleniminoethyl)sulfone produced as above became warm and a mixture of ammonium perchlorate and di(2-ethyleniminoethyl)sulfone burst into flames. Propellant matrices containing ammonium perchlorate as an oxidizing agent and using di(2-propyleniminoethyl)sulfone prepared as above as a curing agent for carboxyl containing binders therein, such as carboxyl terminated polybutadiene and polybutadiene/acrylonitrile, were safely prepared and cured.

We claim:

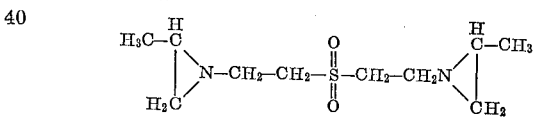

References Cited by the Examiner
UNITED STATES PATENTS 2,596,200   5/1952   Bestian _____ 260—239
3,050,423   8/1962   Hudson _____ 149—19
3,053,709   9/1962   Herty _____ 149—19

OTHER REFERENCES

Bestian: Hiebig's Annalen, vol. 566, pp. 222 and 238 (1950).

NICHOLAS S. RIZZO, *Primary Examiner.*

WALTER A. MODANCE, *Examiner.*